Aug. 24, 1954     D. C. LAW     2,687,142

METAL FLOAT

Filed Sept. 16, 1948

INVENTOR.

Don C. Law.

BY Frank C. Feurman.

ATTORNEY

Patented Aug. 24, 1954

2,687,142

UNITED STATES PATENT OFFICE 2,687,142

METAL FLOAT

Don C. Law, Bay City, Mich., assignor to Magline, Inc., Pinconning, Mich., a corporation of Michigan Application September 16, 1948, Serial No. 49,565

2 Claims. (Cl. 137—452)

This invention relates to a metal float such as used in automotive lifts and similar equipment for effectively closing an orifice against passage of liquid.

One of the prime objects of the invention is to design an air and liquid tight metal float for use in automobile lifts and the like, which will be entirely free from any mechanical joints, and which can be easily and accurately formed to shape with a minimum of labor and machining.

Another object is to provide a float which can be formed of light-weight, relatively thin, hollow, cylindrical stock, the end walls of which are formed and shaped by spinning with the insertion of a plug in one end thereof, eliminating expensive machine work and assembly, said spinning operation also making it possible to increase the thickness of the end walls as desired, so that the float can be balanced and weighted, causing it to float in an upright position.

A further object is to design a float formed of magnesium or similar light-weight metal, thus decreasing the weight and increasing the buoyancy of the float, and provides sufficient metal at the one end so that a tapped hole can be provided, the wall thickness at the opposite end of the float being of sufficient strength to withstand any impact load created when the float seats itself into an orifice or seat.

Still a further object is to provide a float, one end of which can be closed by means of a plug of suitable diameter and depth to suit the passage in the end of the float, which plug can then be secured in position by brazing or welding to form an air and liquid-tight joint.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
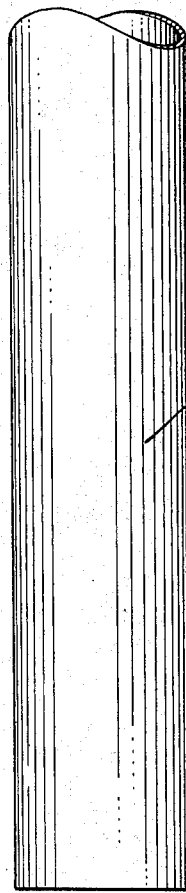
Fig. 1 is an elevational view of a piece of hollow, tubular stock such as used to form my improved float.
Figure 3:
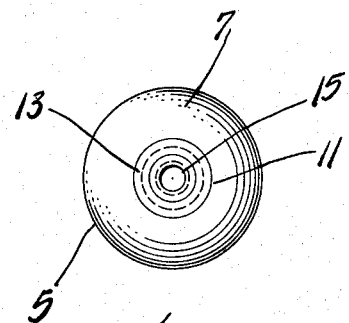
Fig. 3 is a top, plan view thereof.

Referring now more specifically to the drawing in which I have shown the preferred embodiment of my invention. The numeral 5 indicates a length of thin-walled tubing, preferably, but not necessarily formed of magnesium, as other semi-soft alloys or metals may be used with equally good results, but I find that magnesium is very satisfactory for manufacture of the float which forms the subject matter of the instant application.

Figure 2:
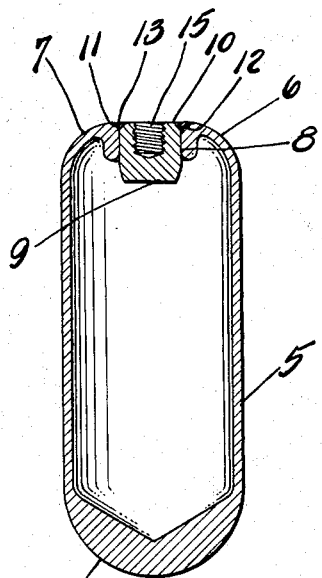
Fig. 2 is a vertical, sectional view showing a completed float.

In making up the float herein described, I first take a length of tubing 5 of proper diameter and form the one end 6 to shape as clearly shown in Fig. 2 of the drawing, the end being rounded and turned inwardly as at 7 to form a centrally disposed inwardly tapered passage 8 of predetermined size, which passage is concentric with the outside diameter of the tube, this shaping being accomplished by spinning, so that the metal is fused and readily flows to required shape and size.

The passage 8 is sealed by means of a plug 9, this plug being placed in position so that the upper flat end 10 is flush with the turned upper end 7 of the tube, the tapered end preventing the plug slipping through when the metal expands, and of course the passage is expanded when the plug is seated, the space between the inwardly curved portion 11 of the end wall and the wall of the plug forming a circumferential groove or trench 12 between the wall of the passage and the plug. A suitable flux is then applied and a pellet of magnesium (not shown), is placed in the groove, after which the application of the proper heat causes the pellet to melt and fill the groove with molten metal 13, brazing the tube and plug to form an air and liquid-tight joint thereat, which effectively seals the one end of the tube, and I wish to direct particular attention to the fact that because the plug is a solid mass of metal, it is possible to heat only the plug to accomplish the brazing.

The next step is to seal the lower end of the tube, and this, too, is a spinning operation, the end 14 being formed to hemispherical shape, having as its outside radius one-half the outside diameter of the tube, and this spinning operation is done in a manner whereby the complete fusing of the metal at the center causes this end also to be air and liquid-tight, thus providing a completely sealed float and building up the end wall thickness so that the float can be balanced as desired.

A blind hole 15 is then drilled in the plug 9 so that the float may be threaded on the end of the valve rod (not shown) if desired and the entire assembly is then sanded or otherwise processed to provide the required finish.

Under certain conditions it may be desired to omit the plug 9 and close both ends of the tube by spinning, and it will be obvious that this can be done without departing from the spirit of the invention, as the wall thickness of the hemispherical ends can be readily controlled as above described.

From the foregoing description, it will be obvious that I have perfected a very simple, practical, and relatively inexpensive metal float and method of forming it.

What I claim is:

1. As an article of manufacture, a float formed of relatively thin light metal adapted to be mounted in a liquid receptacle to control fluid flow through the discharge orifice thereof comprising, a hollow cylindrical body having an integral end wall of hemispherical shape, said end wall being of a much greater thickness than the cylindrical body over its entire hemispherical area, said hemispherical end wall providing a weighted end for said float to maintain the same in an upright position in a body of liquid in said receptacle, and also providing a rigid surface which will withstand impact blows when the float strikes the edges of the receptacle adjacent the discharge opening, said hemispherical end wall being continuous with the cylindrical wall and presenting an unbroken surface with a radius equal to the radius of the cylindrical body, the opposite end of the body being curved inwardly and thence turned reversely with relation to said cylindrical body wall to form a centrally disposed inwardly directed projection having a tapered opening, and a cylindrical plug welded in said passage to form an air-tight liquidproof joint, the outer end of the plug being flush with the outer face of said inwardly curved opposite end to provide a smooth surface for the float.

2. As an article of manufacture, a float formed of relatively thin light metal adapted to be mounted in a liquid receptacle to control fluid flow through the discharge orifice thereof comprising, a hollow cylindrical body having an integral end wall of hemispherical shape, said end wall being of a much greater thickness than the cylindrical body over its entire hemispherical area, said hemispherical end wall providing a weighted end for said float to maintain the same in an upright position in a body of liquid in said receptacle, and also providing a rigid surface which will withstand impact blows when the float strikes the edges of the receptacle adjacent the discharge orifice, said hemispherical end wall also being continuous with the cylindrical wall and presenting an unbroken surface with a radius equal to the radius of the cylindrical body, the opposite end of said cylindrical body being curved inwardly and thence turned reversely with respect to said cylindrical body wall to form a hollow inwardly extending projection having a tapered passage, a cylindrical plug secured in said passage with its outer face flush with the outer face of said inwardly curved end to provide a smooth end surface for the float, said plug having an outer beveled edge, and a grooved area formed around the outer marginal edge of the wall of the inwardly extending projection, said groove being directly adjacent the beveled edge of the plug for receiving a fused metal sealing member and thereby form an airtight liquidproof joint.

References Cited in the file of this patent

UNITED STATES PATENTS

| Number | Name | Date |
|---|---|---|
| 401,701 | Grau | Apr. 16, 1889 |
| 578,744 | Hess | Mar. 16, 1897 |
| 582,324 | Stucki | May 11, 1897 |
| 895,517 | Auken | Aug. 11, 1908 |
| 1,556,817 | Higgins | Oct. 13, 1925 |
| 1,560,017 | Cleland et al. | Nov. 3, 1925 |
| 1,620,728 | Jackson | Mar. 15, 1927 |
| 1,714,733 | Shank | May 28, 1929 |
| 1,829,828 | Gay | Nov. 3, 1931 |
| 1,995,742 | Linnmann | Mar. 26, 1935 |
| 2,030,818 | Harter | Feb. 11, 1936 |
| 2,170,247 | Lambert | Aug. 22, 1939 |
| 2,210,751 | Cronkhite | Aug. 6, 1940 |
| 2,259,633 | Guillaume | Oct. 21, 1941 |
| 2,284,210 | Johnson | May 26, 1942 |
| 2,445,268 | Hodgins | July 13, 1948 |

FOREIGN PATENTS

| Number | Country | Date |
|---|---|---|
| 707,757 | France | Apr. 30, 1931 |